United States Patent Office

3,257,369
Patented June 21, 1966

3,257,369
CATALYSTS HAVING AN IMPROVED ACTIVITY IN THE STEREOSPECIFIC POLYMERIZATION OF ALPHA-OLEFINS AND PROCESS FOR PREPARING SAME
Renato Serra, and Ettore Giachetti, both of Milan, Italy, assignors to Montecatini, Società Generale per l'Industria Mineraria e Chimica, Milan, Italy, a corporation of Italy
No Drawing. Filed May 8, 1961, Ser. No. 108,265
Claims priority, application Italy, May 13, 1960, 8,543/60
29 Claims. (Cl. 260—93.7)

The present invention relates to a new type of catalyst having an improved activity in the stereospecific polymerization of alpha-olefins and to the preparation of the same.

It is known that catalysts comprising transition metal halides, in which the metal has a valence lower than the highest, and organometallic compounds of metals belonging to the 1st, 2nd or 3rd group of the Periodic Table according to Mendeléeff promote the stereospecific polymerization of alpha-olefins.

The metal halides which give the best results are titanium trichloride and vanadium trichloride.

In the last few years, the preparation of $TiCl_3$ has been the object of many studies and various methods of preparing said compound have been employed. $TiCl_3$, obtained by these known methods, is crystalline and has a dark violet color. However, depending on its method of preparation and on its degree of purity, the particular titanium trichlorides obtained possess different activities in the polymerization of alpha olefins, thus producing polymers having different degrees of crystallinity.

A process for improving the purity of $TiCl_3$ by removing $TiCl_2$, $TiCl_4$ or metallic Ti, which may be present in $TiCl_3$, obtained by the reduction of $TiCl_4$ at high temperature with hydrogen, or by removing other metal halides, which are present in $TiCl_3$ obtained by the reduction of $TiCl_4$ with metals not active in the polymerization, is certainly of practical interest, since the catalytic activity of the $TiCl_3$ may thereby be influenced.

Processes for purifying $TiCl_3$, based on the sublimation of $TiCl_3$ and is recrystallization or its crystallization followed by decomposition of one of its addition products, have been studied but have not generally yielded favorable results.

This lack of favorable results has been due to the too low sublimation rate of $TiCl_3$ with respect to the dismutation rate or to the absence of a chemically inert solvent for $TiCl_3$. The lack of success encountered in the research relating to a substance capable of addition to $TiCl_3$ in order to form a crystallizable complex compound which, by successive decomposition could regenerate the starting $TiCl_3$, also appears to be a reason for this lack of favorable results.

It is known that $TiCl_3$ and ammonia form a complex, $TiCl_3 \cdot 6NH_3$. However, only a compound still containing ammonia ($TiCl_3 \cdot 2NH_3$), can be isolated by thermal decomposition of this complex and therefore this compound is not active in the polymerization of alpha-olefins.

It has now been surprisingly found that it is possible to isolate complexes, comprising transition metal halides having a valence lower than their highest one and an organic base, these complexes being soluble in the organic base and from which complexes the crystalline transition metal halide, having an improved activity in the stereospecific polymerization of alpha-olefins, can be again recovered with very good total yields.

An object of the present invention is therefore to provide a new type of catalyst, having improved activity in the stereospecific polymerization of alpha-olefins such as propylene, butene-1, methylpentene-1, comprising an organometallic compound of a metal belonging to the 1st, 2nd or 3rd group of the Periodic Table according to Mendeléeff and a transition metal halide in which the metal has a valence lower than its highest one, wherein the transition metal halide is obtained by thermal decomposition of the complex compound formed by dissolving the transition metal halide in an organic base.

For example, when using pyridine as the organic base, $TiCl_3$ can be dissolved therein at the boiling point of the base. Upon cooling the solution thus obtained, a green crystalline complex corresponding to the formula $TiCl_3 \cdot 3Py$ (Py=pyridine) is precipitated.

By thermal treatment of this complex at 250–400° C., preferably under vacuum, all the pyridine is removed and crystalline $TiCl_3$, having a higher activity, is recovered.

The capability of crystallizing the transition metal halide-organic base complex in pyridine or other solvents (e.g. chloroform), makes it possible to purify the complex and therefore also the transition metal halide obtainable therefrom by simple thermal decomposition.

Moreover, the lack of a soluble, crystallizable addition compound of the transition metal halide, decomposable into the transition metal halide, not only has limited the possibility of purifying this halide, but also was an obstacle to obtaining a suitable support either active or inactive, for the transition metal halide for use in stereospecific polymerization.

The providing of a support for the transition metal halide is particularly desirable in the polymerization of alpha-olefins carried out in the presence of fluidized bed catalysts. As known, high special flow-rates of the fluid are employed in these processes thus requiring a strong adhesion of the solid catalyst to support. The solubility of the aforementioned complex in pyridine, or in other solvents makes it possible to support said complex on a large number of inorganic supports. Thus by successive thermal decompositions at 250–400° C., there is obtained a transition metal halide perfectly adherent to the support.

These supported transition metal halide catalysts can be obtained either by impregnating the support surface with a solution of the complex, or by precipitation of the complex on the support surface by addition of a non-solvent (e.g., saturated aliphatic or aromatic hydrocarbons such as hexane, heptane, benzene, toluene, ethylbenzene a.s.o.) or also by forming the complex directly on the support surface itself. This last method can be carried out either by mixing first the transition metal halide with the support and then introducing the organic base in liquid or vapor phase, or preferably by impregnating the support with the organic base and then introducing the transition metal halide in the desired amount. The aforementioned methods for obtaining the supported catalysts are merely illustrative and any other suitable method or combinations thereof can also be used. In all cases, however, the final stage of the supportation method consists of the thermal decomposition of the complex at a temperature between 200° and 400° C., preferably between 250° and 350° C., under an inert gas or under vacuum.

As the transition metal halides, titanium trichloride or vanadium trichloride are preferably used.

Pyridine quinoline or isoquinoline are preferably used as the organic base. The best results are obtained by using $CaCl_2$ or $NaCl$ as supports, but various other inorganic support may be used. Examples of such supports are sulfates, chlorides, carbonates, oxides etc., of alkaline or earth-alkaline metals, or other inert supports such as, alumina, silica gel, activated carbon, etc. provided they are not decomposed by and do not react with the catalyst components.

Obviously, supports which can be removed from the polymer by dissolution with the usual agents used for treating the polymer such as, water, dilute acids, alcohols etc., are preferred.

Generally, more satisfactory results are obtained with inorganic salts capable of forming complexes with the organic base, since there is thus obtained a more effective cohesion of the transition metal halide to the surface of the support itself.

For instance in case of $CaCl_2$, and pyridine, the formation of a $CaCl_2$-pyridine complex takes place, which complex is completely decomposable at temperatures lower than 300° C.

The transition metal halide-organic base complexes can be obtained, as mentioned above, by dissolving the transition metal halide in the organic base.

Given hereinbelow, merely as an illustration and not as a limitation of the present invention is a method for preparing the $TiCl_3 \cdot 3Py$ and $VCl_3 \cdot Py$ (Py=pyridine) complexes.

A. *Preparation of the $TiCl_3 \cdot 3Py$ complex.*—Since the compounds employed are highly hydroscopic and easily alterable by the action of moisture or atmospheric oxygen, all the operations are carried out under dry nitrogen.

5 g. of $TiCl_3$ (alpha modification, obtained by reduction of $TiCl_4$ at high temperature with hydrogen) are introduced into a flask containing 25 g. of anhydrous pyridine cooled to $-10°$ C.

The mixture, after reaching room temperature, is heated to its boiling point until complete solubilization is attained. The precipitation of the $TiCl_3.3Py$ addition compound in the form of very fine green needles is obtained by cooling.

9.5 g. of this product are isolated by filtration followed by vacuum drying at 70° C.

Analysis of the complex obtained:

| For $TiCl_3.3Py$— | Percent by weight |
|---|---|
| N calculated | 10.75 |
| N found | 10.73 |
| Cl calculated | 27.1 |
| Cl found | 24.1 |
| Ti calculated | 12.25 |
| Ti found | 11.43 |

Solubility of the $TiCl_3.3Py$ complex in pyridine:

Temperature ° C.—20, 115; g./l.—90, 400.

Thermal decomposition of the complex:
Minimum decomposition temperature ____° C__ 250
Maximum decomposition temperature __° C__ 450
Yield upon decomposition to $TiCl_3$,
 equals _____percent__ 88

(Calculated with respect to the theoretical yield.)

Analytical data of the product obtained by thermal decomposition of $TiCl_3.3Py$:

Cl=66.83%–66.80% by weight;
Ti=31.50%–31.52% by weight;
N=.010% by weight.

(The spectrum of the product powder shows prevailing, in the crystalline phase, the α-form of $TiCl_3$.)

B. *Preparation of the $VCl_3.3Py$ complex.* — 20 g. of $VCl_3$ are introduced into 80 g. of anhydrous pyridine cooled to $-10°$ C. The mixture is heated at first slowly and then to its boiling point until a complete solubilization is attained. Upon cooling, a dark blue solid is precipitated. The precipitation is completed by dilution with 250 ml. of anhydrous n-heptane. The precipitate is filtered and vacuum dried at 70° C.

40 g. of a dark blue crystalline solid are obtained.

Analysis of the complex obtained:

| For $TiCl_3.3Py$— | Percent by weight |
|---|---|
| N calculated | 10.65 |
| N found | 10.06 |
| Cl calculated | 27.00 |
| Cl found | 25.54 |
| V calculated | 12.95 |
| V found | 13.51 |

Solubility of the $VCl_3.3Py$ complex in pyridine:

Temperature ° C.—20, 115; g./l.—90, 250.

Thermal decomposition of $VCl_3.3Py$:

Minimum decomposition temperature ____° C__ 300
Maximum decomposition temperature ___° C__ 500
Yield upon decomposition to $VCl_3$ (calculated with respect to the theoretical yield),
 equals _____percent__ 72

A crystalline product, active in the stereospecific polymerization, is obtained.

*Example 1*

(a) 39.5 of $TiCl_3.3Py$, obtained as described above, are placed in a glass tube having a diameter of 40 mm. which is kept in a horizontal oven.

A suction of about 1 mm. of Hg is applied to one end of the tube and the evolved vapors are condensed in a suitable trap at $-78°$ C.

The temperature is gradually raised to 400° C. by progressive increases of 50° C. every half an hour. The product is then left at 400° C. for about 30 minutes. After cooling, 13.7 g. of $TiCl_3$ are discharged under nitrogen (yield=88%, with respect of the theoretical yield).

1.5 l. of heptane dehydrated on $Al_2O_3$ and the polymerization catalyst prepared in "in vitro" by mixing at room temperature 1.0 g. of $TiCl_3$, obtained as described above, with 4.0 g. of $Al(C_2H_5)_3$ are introduced into a 4-liter autoclave maintained at the constant temperature of 75° C. by the circulation of warm oil.

Propylene is then introduced into autoclave and the polymerization is carried out under the constant pressure of 7 atm. for 6 hours. The discharged polymer is first washed with methanol, acidified with HCl, then washed with pure methanol and finally dried. This polymer product amounts to 800 g. and possesses an intrinsic viscosity (determined in tetrahydronaphthalene at 135° C.) of 3.2 and also leaves a residue, after an extraction with boiling heptane, of 81.9%.

(b) When a comparative polymerization run carried out under conditions similar to (a), employing an amount equivalent to the amount of $TiCl_3$ used for preparing the complex, instead of $TiCl_3$, obtained by thermal decomposition of the $TiCl_3.3Py$ complex, only 420 g. of polypropylene are obtained after 6 hours. This polypropylene has an intrinsic viscosity (determined in tetrahydronaphthalene at 135° C.) of 3.7 and a residue, after an extraction with boiling heptane, of 81.2%.

(c) In another polymerization run carried out under conditions similar to (b) above, the $TiCl_3$ used is subjected for 6 hours to heating to 400° C. under high vacuum.

After 6 hours of polymerization, 415 g. of polypropylene having an intrinsic viscosity (determined in tetrahydronaphthalene at 135° C.) of 3.8 and a residue, after extraction with boiling heptane, of 79.9% are obtained.

*Example 2*

(a) 40.0 g. of $VCl_3.3Py$, obtained as described above, are placed in a glass tube and slowly heated to 450° C. under vacuum. After 2 hours at this temperature, 11.5 g. of product are discharged with a decomposition yield of 72%, based on the theoretical yield.

1.5 liters of heptane, dehydrated on $Al_2O_3$, and the polymerization catalyst prepared by mixing 2.2 g. of vanadium compound (obtained as described by thermal decomposition of VCl$_3$·3Py) and 4 g. of Al(C$_2$H$_5$)$_3$, are introduced into a 4-liter autoclave kept at 75° C. by warm oil circulation.

Propylene is then introduced into the autoclave until a pressure of 7 atm. is reached. After polymerization for 4 hours under constant pressure, the polypropylene obtained is recovered, washed with methanol, acidified with HCl, then with pure methanol, dried and weighed.

400 g. of a polymer having an intrinsic viscosity (determined in tetrahydronaphthalene at 135° C.) of 5.35 and residue, after an extraction with boiling heptane, of 80.7%, are recovered (b) A similar run is carried out using 2.2 g. of VCl$_3$ (the same as that used for preparing the VCl$_3$·3Py complex). After polymerization for 4 hours, 390 g. of a polymer having an intrinsic viscosity (in tetrahydronaphthalene at 135° C.) of 4.6 and a heptane residue of 79.5% are obtained.

Example 3

5.0 g. of TiCl$_3$ are poured into 35 g. of anhydrous pyridine which is cooled to −20° C. The mixture is then slowly heated to its boiling point until a complete solubilization is reached.

To the still boiling solution thus obtained, 100 g. of commercial CaCl$_2$, in the form of 1 to 2 mm. chips, which have been completely dehydrated by heating to 400° C. under vacuum, are quickly added.

The flask is vigorously agitated in order to equalize the absorption of the solution on the whole surface of the introduced CaCl$_2$. The impregnated solid is vacuum dried at 100° C. and is then heated, again under vacuum, to 400° C., thus obtaining, by the decomposition of the TiCl$_3$·3Py complex thereon absorbed, a homogeneous catalyst of TiCl$_3$ supported on CaCl$_2$.

This supported product is then introduced into a 4-liter autoclave, kept at 75° C. by warm oil circulation, together with 50 g. of CaCl$_2$ in the form of 1 to 2 mm. granules impregnated with 4.0 g. of concentrated $$Al(C_2H_5)_3$$

Propylene is then introduced until a pressure of 5 atm. is attained and the polymeriaztion is carried out under constant pressure for 5 hours.

280 g. of polypropylene are discharged from the autoclave. The polymer is separated from the support by dissolving the latter by washing treatments with 1:1 methanol-water mixtures. This polymer possesses an intrinsic viscosity (determined in tetrahydronaphthalene at 135° C.) of 2.3, a residue after an extraction with boiling heptane of 87.4% and a flexural strength of 8500 kg./cm.$^2$ (determined according to ASTM 747-58T).

Example 4

100 g. of commercial anhydrous CaCl$_2$ (granular size=1 to 2 mm.), cooled to −30° C., are added to 15 g. of anhydrous pyridine also cooled to −30° C. The mixture is vigorously shaken by hand in order to obtain the homogeneous absorption of all of the pyridine. 10.0 g. of TiCl$_3$ are then successively added, in small portions while agitating and cooling. At low temperateurs, TiCl$_3$ does not form the complex with pyridine, thus the homogeneous distribution on the support surface is not achieved at these temperatures. The temperature is then allowed to rise slowly while continuing the agitation, thus starting the formation reaction of the TiCl$_3$·3Py complex, which complex adheres to the calcium chloride surface. The reaction can be considered to be completed after 30 minutes.

The complex is dried at 100° C. and then decomposed at 400° C. under vacuum. In this way a more homogeneous distribution of TiCl$_3$ and a higher concentration of this TiCl$_3$ on the surface of the support are obtained.

30 g. of TiCl$_3$ so supported are then introduced into a 4 liter autoclave, kept at 75° C. by warm oil circulation, together with 50 g. of small pieces of anhydrous calcium chloride impregnated with 4.0 g. of Al(C$_2$H$_5$)$_3$. Gaseous propylene under a pressure of 5 atm. is then introduced and polymerized for 5 hours under constant pressure.

450 g. of polypropylene are obtained. This polymer is separated from the support by dissolving the latter by means of a washing with a water-methanol solution.

The polymer possesses an intrinsic viscosity (determined in tetrahydronaphthalene at 135° C.) of 2.3, a residue after an extraction with boiling heptane of 86.2 and a flexural strength of 9400 kg./cm.$^2$ (determined according to ASTM 747-58T).

Example 5

420 g. of sodium chloride crystal (size=0.2–0.5 mm.), dried under vacuum at 400° C. for several hours, are mixed in a 2,000 ml. glass flask, with 50 g. of TiCl$_3$. The mixture is vigorously agitated in order to obtain a homogeneous dispersion of TiCl$_3$ on the sodium chloride surface. The mixture is then cooled to −30° C.

70 g. of anrydrous pyridine, also cooled to −30° C., are quickly added and the mixture is allowed to reach room temperature while maintaining continuous agitation. The reaction for forming the TiCl$_3$-pyridine complex is thus started and is substantially completed after a few minutes. If the agitation is constant and effective, the dispersion of the TiCl$_3$·3Py complex, formed on the sodium chloride surface, is very homogeneous.

The supported complex is then dried at 100° C. and finally decomposed at 300° C. under vacuum. The TiCl$_3$ obtained is firmly fixed and homogeneously distributed on the sodium chloride surface.

20 g. of TiCl$_3$ so supported are then introduced into a 4-liter autoclave, kept at the constant temperature of 75° C. by warm oil circulation, together with 50 g. of the same size of sodium chloride impregnated with 4.0 g. of Al(C$_2$H$_5$)$_3$.

Gaseous propylene is then introduced and polymerized for 5 hours under a constant pressure of 5 atm.

360 g. of polypropylene are thus obtained. The separation of the polymer from the support is carried out by dissolving the latter by means of a washing with methanol and water.

The obtained polymer possesses an intrinsic viscosity (determined in tetrahydronaphthalene at 135° C.) of 2.6, a residue after an extraction with boiling heptane of 86.3% and a flexural strength of 9,000 kg./cm.$^2$ (determined according to ASTM 747-58T).

Example 6

(a) A catalyst prepared separately, in vitro, by mixing 2.5 g. of TiCl$_3$ (as obtained in Example 1 by thermal decomposition of the TiCl$_3$·3Py complex) with 5.0 g. of Al(C$_2$H$_5$)$_3$, is introduced in a 4-liter autoclave, kept at 75° C. by warm oil circulation.

2.5 liters of butene-1 are then introduced into the autoclave and the polymerization is carried out for 10 hours.

At the end of this period, after having evaporated the monomer introduced in excess and decomposed the catalyst with methanol, the obtained polymer is first washed with methanol acidified with hydrochloric acid and then with pure methanol.

After drying, the obtained polymer amounts to 320 g. and shows an intrinsic viscosity of 2.5 (determined in tetrahydronaphthalene) and a residue, after an extraction with boiling ether, of 73.0%.

(b) When a comparative polymerization run is carried out under conditions similar to (a), employing an amount equivalent to the amount of TiCl$_3$ used for preparing the complex instead of TiCl$_3$, obtained by thermal decomposition of the TiCl$_3$·3Py complex, only 185.0 g. of polybutene are obtained after 10 hours.

This polybutene has an intrinsic viscosity (determined in tetrahydronaphthalene at 135° C.) of 2.1 and a residue, after an extraction with boiling ether, of 74.2%.

Many variations and modifications can of course be

Having thus described the present invention, what it is desired to secure and claim by Letters Patent is:

1. A catalyst having improved activity in the stereospecific polymerization of alpha-olefins, comprising an organometallic compound of a metal selected from the group consisting of the 1st, 2nd and 3rd groups of the Periodic Table according to Mendeléeff and of a transition metal halide selected from the group consisting of vanadium trichloride and titanium trichloride in which the metal has a valence lower than its highest one, characterized in that the transition metal halide is obtained in a crystalline form by thermal decomposition at temperatures ranging from about 200° C. to 400° C. of a complex compound formed by dissolving the transition metal halide in an organic base selected from the group consisting of pyridine, quinoline and isoquinoline.

2. A catalyst according to claim 1, characterized in that the decomposition of the complex compound is carried out under vacuum.

3. A catalyst according to claim 1, characterized in that the thermal decomposition of the complex compound takes place at a temperature between 250° C. and 350° C.

4. A catalyst according to claim 1, characterized in that pyridine is used as the organic base.

5. A catalyst according to claim 1, characterized in that titanium trichloride is used as the transition metal halide.

6. A catalyst according to claim 1, characterized in that vanadium trichloride is used as the transition metal halide.

7. A catalyst according to claim 1, characterized in that triethyl aluminum is used as the organometallic compound.

8. A catalyst according to claim 1, characterized in that the complex compound is recrystallized before being subjected to the thermal decomposition.

9. A catalyst according to claim 8, characterized in that the complex compound is recrystallized from pyridine.

10. A process for preparing a catalyst according to claim 1, characterized in that the said transition metal halide is dissolved by heating in said organic base and the complex compound thus formed, after being precipitated from the solution thus obtained, is thermally decomposed.

11. A process according to claim 10, characterized in that the complex compound is precipitated by cooling the solution obtained by dissolving the transition metal halide in the organic base.

12. A process according to claim 10, characterized in that the complex compound is precipitated by adding a non-solvent compound to the solution formed by dissolving the transition metal halide in the organic base.

13. A process according to claim 12, characterized in that a saturated aliphatic hydrocarbon is used as the non-solvent compound.

14. A process according to claim 12, characterized in that an aromatic compound is used as the non-solvent compound.

15. A catalyst having an improved activity in the polymerization of alpha-olefins, comprising an organometallic compound of a metal selected from the group consisting of the 1st, 2nd and 3rd groups of the Periodic Table according to Mendeléeff, a transition metal halide selected from the group consisting of vanadium trichloride and titanium trichloride, in which the metal has a valence lower than its highest one, and an inorganic compound which acts as a support for the product obtained by the thermal decomposition at temperatures ranging from about 200° C. to 400° C. of a complex formed by dissolving the transition metal halide in an organic base selected from the group consisting of pyridine, quinoline and isoquinoline.

16. A supported catalyst according to claim 15, characterized in that the inorganic support is first impregnated with the solution obtained by dissolving the transition metal halide in the organic base and is then subjected to a thermal treatment at a temperature at which the transition metal halide organic base complex is decomposed.

17. A supported catalyst according to claim 15, characterized in that a non-solvent compound is added to the inorganic support impregnated with the solution obtained by dissolving the transition metal halide in the organic base.

18. A supported catalyst according to claim 15, characterized in that the organic base is added to a support previously mixed with the transition metal halide and said support is then thermally treated at a temperature at which the transition metal halide organic base complex is decomposed.

19. A supported catalyst according to claim 18, characterized in that the organic base is added in the liquid phase.

20. A supported catalyst according to claim 19, characterized in that the organic base is added in the vapor phase.

21. A supported catalyst according to claim 15, characterized in that the transition metal halide is added to the support previously impregnated with an organic base and said support is then thermally treated at a temperature at which the transition metal halide organic base complex is decomposed.

22. A supported catalyst according to claim 15, characterized in that a member selected from the group consisting of the halide, sulfates, carbonates of alkaline and alkaline earth metals, silica gel and activated carbon is employed as an inorganic support.

23. A supported actalyst according to claim 22, characterized in that calcium chloride is used as anorganic support.

24. A supported catalyst according to claim 22, characterized in that sodium chloride is used as an inorganic support.

25. A process for polymerizing an alpha-olefin wherein the alpha-olefin is polymerized in the presence of a catalyst according to claim 1.

26. A process for polymerizing an alpha-olefin wherein the alpha-olefin is polymerized in the presence of a catalyst according to claim 15.

27. A process for polymerizing propylene wherein the propylene is polymerized in the presence of a catalyst according to claim 1.

28. A process for polymerizing propylene wherein the propylene is polymerized in the presence of a catalyst according to claim 15.

29. A process for polymerizing butene-1, wherein the butene-1 is polymerized in the presence of a catalyst according to claim 1.

References Cited by the Examiner

UNITED STATES PATENTS

| | | | |
|---|---|---|---|
| 2,880,199 | 3/1959 | Jezl | 260—93.7 |
| 2,886,561 | 5/1959 | Reynolds | 260—94.9 |
| 2,890,212 | 6/1959 | Murray | 260—93.7 |
| 2,925,392 | 2/1960 | Seelbach et al. | 252—429 |
| 2,962,451 | 11/1960 | Schreyer | 252—429 |
| 3,008,943 | 11/1961 | Guyer | 260—93.7 |
| 3,055,878 | 9/1962 | Janoski | 260—94.9 |
| 3,139,418 | 6/1964 | Marullo | 260—94.9 |

FOREIGN PATENTS 573,872   3/1959   Belgium.

JOSEPH L. SCHOFER, *Primary Examiner.*

JULIUS GREENWALD, *Examiner.*

R. D. LOVERING, F. L. DENSON, *Assistant Examiners.*